US010372943B1

(12) United States Patent
Rodriguez De Castro et al.

(10) Patent No.: US 10,372,943 B1
(45) Date of Patent: Aug. 6, 2019

(54) CRYPTOGRAPHIC ASIC WITH COMBINED TRANSFORMATION AND ONE-WAY FUNCTIONS

(71) Applicant: Blockchain ASICs LLC, San Francisco, CA (US)

(72) Inventors: Edward L. Rodriguez De Castro, San Francisco, CA (US); Sagar V. Reddy, Sunnyvale, CA (US)

(73) Assignee: Blockchain ASICs LLC, San Francisco, CA (US)

( * ) Notice: Subject to any disclaimer, the term of this patent is extended or adjusted under 35 U.S.C. 154(b) by 0 days.

(21) Appl. No.: 16/139,332

(22) Filed: Sep. 24, 2018

Related U.S. Application Data

(60) Provisional application No. 62/645,609, filed on Mar. 20, 2018.

(51) Int. Cl.
*G06F 21/00* (2013.01)
*G06F 21/72* (2013.01)
(Continued)

(52) U.S. Cl.
CPC .............. *G06F 21/72* (2013.01); *G06F 21/76* (2013.01); *H04L 9/0637* (2013.01);
(Continued)

(58) Field of Classification Search
USPC ........................................................ 713/189
See application file for complete search history.

(56) References Cited

U.S. PATENT DOCUMENTS

| 5,442,705 A | 8/1995 | Miyano |
| 5,774,552 A | 6/1998 | Grimmer |

(Continued)

FOREIGN PATENT DOCUMENTS

| WO | WO-2017123902 A1 | 7/2017 |

OTHER PUBLICATIONS

Atighehchi, Kevin; Muntean, Traian. Generic Parallel Cryptography for Hashing Schemes. 2013 IEEE 12th International Symposium on Parallel and Distributed Computing. https://ieeexplore.ieee.org/stamp/stamp.jsp?tp=&arnumber=6663582 (Year: 2013).*

(Continued)

*Primary Examiner* — Jeremiah L Avery
(74) *Attorney, Agent, or Firm* — Schwegman Lundberg & Woessner, P.A.

(57) ABSTRACT

A transform-enabled integrated circuit is provided with a combined transformation/hashing block, such as for cryptographic proof-of-work systems. The transform-enabled integrated circuit embeds components for a transformation function among hashing function components within the cryptographic datapath of the transform-enabled integrated circuit. The combined transformation/hashing block may be configured after the manufacture of the integrated circuit to embody as circuitry any one of a plurality of mathematical transformation functions, thus enabling a user to systemically modify the cryptographic operations performed by the integrated circuit while retaining the high performance and efficiency characteristics of application specific integrated circuits. Embodiments modify the internal intermediate state variables of the hashing function to transform and hash an input message. Method and computer program product embodiments are also provided. The technology flexibly enables the deployment of application-specific integrated circuits (ASICs) within blockchain systems, digital rights management, secure token, and other cryptography-related fields.

20 Claims, 10 Drawing Sheets

(51) Int. Cl.
  *G06F 21/76* (2013.01)
  *H04L 9/06* (2006.01)
  *H04L 9/32* (2006.01)

(52) U.S. Cl.
  CPC .......... *H04L 9/0643* (2013.01); *H04L 9/3239* (2013.01); *H04L 2209/122* (2013.01); *H04L 2209/38* (2013.01); *H04L 2209/603* (2013.01)

(56) References Cited

U.S. PATENT DOCUMENTS

| | | |
|---|---|---|
| 6,581,162 B1 | 6/2003 | Angelo et al. |
| 6,708,273 B1 | 3/2004 | Ober et al. |
| 6,763,465 B1 | 7/2004 | Kelley et al. |
| 7,177,421 B2 | 2/2007 | Buer et al. |
| 7,191,341 B2 | 3/2007 | Paaske et al. |
| 7,234,021 B1 | 6/2007 | Chilton |
| 7,472,369 B1 | 12/2008 | Bain et al. |
| 7,483,945 B2 | 1/2009 | Blumofe |
| 7,606,362 B1 | 10/2009 | Streicher et al. |
| 7,644,278 B2 | 1/2010 | Catherman et al. |
| 7,675,313 B1 | 3/2010 | Tang et al. |
| 7,681,103 B2 | 3/2010 | Devadas et al. |
| 7,725,738 B1 | 5/2010 | Langhammer et al. |
| 7,818,584 B1 | 10/2010 | Joyce et al. |
| 7,890,917 B1 | 2/2011 | Young et al. |
| 7,892,917 B2 | 2/2011 | Cho et al. |
| 7,971,017 B1 | 6/2011 | Mann et al. |
| 8,132,005 B2 | 3/2012 | Tarkkala et al. |
| 8,332,931 B1 | 12/2012 | Tran et al. |
| 8,347,096 B2 | 1/2013 | Hoornaert et al. |
| 8,402,241 B2 | 3/2013 | Miranda et al. |
| 8,683,210 B2 | 3/2014 | Devadas |
| 8,751,786 B1 | 6/2014 | Feng et al. |
| 8,751,855 B2 | 6/2014 | Yairi et al. |
| 8,782,396 B2 | 7/2014 | Ziola et al. |
| 9,479,328 B1 | 10/2016 | Wilburn et al. |
| 9,495,668 B1 | 11/2016 | Juels |
| 9,672,385 B2 | 6/2017 | Newell |
| 9,866,370 B2 | 1/2018 | Doi et al. |
| 9,893,885 B1 | 2/2018 | Miller et al. |
| 10,200,196 B1 | 2/2019 | Rodriguez De Castro |
| 2001/0021927 A1 | 9/2001 | Laurent et al. |
| 2001/0044897 A1 | 11/2001 | Ishiguro et al. |
| 2002/0080958 A1 | 6/2002 | Ober et al. |
| 2002/0085710 A1 | 7/2002 | Clark et al. |
| 2002/0147918 A1 | 10/2002 | Osthoff et al. |
| 2002/0184512 A1 | 12/2002 | Cardoso |
| 2002/0199110 A1 | 12/2002 | Kean |
| 2003/0056139 A1 | 3/2003 | Murray et al. |
| 2004/0005051 A1 | 1/2004 | Wheeler et al. |
| 2004/0019789 A1 | 1/2004 | Buer |
| 2004/0088552 A1 | 5/2004 | Candelore |
| 2005/0047543 A1 | 3/2005 | Sandstrom |
| 2005/0132184 A1 | 6/2005 | Palliyil et al. |
| 2006/0041510 A1 | 2/2006 | Gagnon et al. |
| 2006/0059368 A1 | 3/2006 | Fayad et al. |
| 2006/0072748 A1 | 4/2006 | Buer |
| 2006/0184799 A1 | 8/2006 | Seo et al. |
| 2006/0248346 A1 | 11/2006 | Shiomi et al. |
| 2006/0273147 A1 | 12/2006 | Jackson |
| 2006/0291650 A1 | 12/2006 | Ananth |
| 2007/0024316 A1 | 2/2007 | Dellow |
| 2007/0090920 A1 | 4/2007 | Canter et al. |
| 2007/0124818 A1 | 5/2007 | Bumiller et al. |
| 2007/0208918 A1 | 9/2007 | Harbin et al. |
| 2007/0230693 A1 | 10/2007 | Mueller et al. |
| 2007/0245159 A1 | 10/2007 | Youn |
| 2007/0294497 A1 | 12/2007 | Chen |
| 2008/0148001 A1 | 6/2008 | Gehrmann et al. |
| 2008/0170694 A1 | 7/2008 | Ryan et al. |
| 2008/0235772 A1 | 9/2008 | Janzen |
| 2008/0263353 A1 | 10/2008 | Droms |
| 2009/0024784 A1 | 1/2009 | Wang et al. |
| 2009/0067686 A1 | 3/2009 | Boshra et al. |
| 2009/0169019 A1 | 7/2009 | Bauchot et al. |
| 2009/0202068 A1 | 8/2009 | Qureshi |
| 2009/0238362 A1 | 9/2009 | Kitani et al. |
| 2009/0257595 A1 | 10/2009 | De Cesare et al. |
| 2009/0259855 A1 | 10/2009 | De Cesare et al. |
| 2009/0320127 A1 | 12/2009 | Hong |
| 2010/0042845 A1 | 2/2010 | Kobayashi et al. |
| 2010/0088752 A1 | 4/2010 | Nagulakonda et al. |
| 2010/0095357 A1 | 4/2010 | Willis et al. |
| 2010/0220853 A1 | 9/2010 | Schneider |
| 2010/0242122 A1 | 9/2010 | Goto |
| 2010/0250967 A1 | 9/2010 | Miwa |
| 2011/0066835 A1 | 3/2011 | Kothari et al. |
| 2011/0119293 A1 | 5/2011 | Taylor et al. |
| 2011/0179289 A1 | 7/2011 | Guenther |
| 2011/0225128 A1 | 9/2011 | Jarrett et al. |
| 2011/0268269 A1 | 11/2011 | Spalka et al. |
| 2011/0311051 A1 | 12/2011 | Resch et al. |
| 2012/0060039 A1 | 3/2012 | Leclercq |
| 2012/0066504 A1 | 3/2012 | Hird et al. |
| 2012/0069995 A1 | 3/2012 | Matthews, Jr. |
| 2012/0079287 A1 | 3/2012 | Leclercq |
| 2012/0151223 A1 | 6/2012 | Conde Marques et al. |
| 2012/0309348 A1 | 12/2012 | De Atley et al. |
| 2013/0065669 A1 | 3/2013 | Michaelson et al. |
| 2013/0230166 A1 | 9/2013 | Bauchot et al. |
| 2014/0016776 A1 | 1/2014 | Van Foreest et al. |
| 2014/0156531 A1 | 6/2014 | Poon et al. |
| 2014/0164779 A1 | 6/2014 | Hartley et al. |
| 2014/0205092 A1 | 7/2014 | Hartley et al. |
| 2014/0258188 A1 | 9/2014 | Chen et al. |
| 2014/0358792 A1 | 12/2014 | Berke et al. |
| 2014/0359268 A1 | 12/2014 | Jauhiainen et al. |
| 2014/0359303 A1 | 12/2014 | Berke et al. |
| 2015/0003607 A1 | 1/2015 | Choi et al. |
| 2015/0052351 A1 | 2/2015 | Nodehi Fard Haghighi et al. |
| 2015/0086016 A1 | 3/2015 | Oshida et al. |
| 2015/0113278 A1 | 4/2015 | Cocchi et al. |
| 2015/0134555 A1 | 5/2015 | Fancher et al. |
| 2015/0163211 A1 | 6/2015 | Chellappa et al. |
| 2015/0255052 A1 | 9/2015 | Rex |
| 2015/0294308 A1* | 10/2015 | Pauker ............... G06Q 20/3827 705/67 |
| 2015/0302409 A1 | 10/2015 | Malek et al. |
| 2015/0317644 A1 | 11/2015 | Chanez et al. |
| 2015/0332283 A1 | 11/2015 | Witchey |
| 2016/0092687 A1 | 3/2016 | Boenisch et al. |
| 2016/0099922 A1 | 4/2016 | Dover |
| 2016/0148232 A1 | 5/2016 | Besehanic |
| 2016/0180343 A1 | 6/2016 | Poon |
| 2016/0188910 A1 | 6/2016 | Nakkiran |
| 2016/0261565 A1 | 9/2016 | Lorenz et al. |
| 2016/0283920 A1 | 9/2016 | Fisher |
| 2016/0285636 A1 | 9/2016 | Davoust et al. |
| 2016/0294783 A1 | 10/2016 | Piqueras Jover et al. |
| 2016/0330034 A1 | 11/2016 | Back et al. |
| 2016/0358184 A1 | 12/2016 | Radocchia et al. |
| 2017/0017957 A1 | 1/2017 | Radu |
| 2017/0046516 A1 | 2/2017 | Henry |
| 2017/0046517 A1 | 2/2017 | Henry |
| 2017/0109668 A1 | 4/2017 | Marcu et al. |
| 2017/0109676 A1 | 4/2017 | Marcu et al. |
| 2017/0126414 A1 | 5/2017 | Goel et al. |
| 2017/0163760 A1 | 6/2017 | Wood et al. |
| 2017/0206382 A1 | 7/2017 | Rodriguez De Castro et al. |
| 2017/0221055 A1 | 8/2017 | Carlsson et al. |
| 2017/0228731 A1 | 8/2017 | Sheng et al. |
| 2017/0236121 A1 | 8/2017 | Lyons et al. |
| 2017/0243176 A1* | 8/2017 | Hanke ............... G06Q 20/0655 |
| 2017/0250796 A1* | 8/2017 | Samid .................. H04L 9/0838 |
| 2017/0310653 A1 | 10/2017 | Zhang |
| 2017/0331624 A1* | 11/2017 | Samid .................. H04L 9/0618 |
| 2017/0345019 A1 | 11/2017 | Radocchia et al. |
| 2018/0006826 A1 | 1/2018 | Smith et al. |
| 2018/0012311 A1 | 1/2018 | Small et al. |
| 2018/0041345 A1 | 2/2018 | Maim |
| 2018/0046956 A1 | 2/2018 | Marcu et al. |
| 2018/0048462 A1 | 2/2018 | Salmela et al. |
| 2018/0054491 A1 | 2/2018 | Mankovskii et al. |

(56) References Cited

U.S. PATENT DOCUMENTS

| | | | |
|---|---|---|---|
| 2018/0089685 | A1 | 3/2018 | McGregor et al. |
| 2018/0108024 | A1 | 4/2018 | Greco et al. |
| 2018/0131519 | A1 | 5/2018 | Le Scouarnec et al. |
| 2018/0136633 | A1 | 5/2018 | Small et al. |
| 2018/0137512 | A1 | 5/2018 | Georgiadis et al. |
| 2018/0152297 | A1 | 5/2018 | Fielding et al. |
| 2018/0184290 | A1 | 6/2018 | Luo et al. |
| 2018/0227275 | A1 | 8/2018 | Russinovich et al. |
| 2018/0331832 | A1 | 11/2018 | Pulsifer |
| 2019/0007222 | A1 | 1/2019 | Noguchi |

OTHER PUBLICATIONS

Han, Derain et al. High-performance Implementation of a New Hash Function on FPGA. 2012 14th International Conference on Advanced Communication Technology (ICACT). https://ieeexplore.ieee.org/stamp/stamp.jsp?tp=&arnumber=6174591 (Year: 2012).*

Lao, Yingjie; Parhi, Keshab K. Obfuscating DSP Circuits via High-Level Transformations. IEEE Transactions on Very Large Scale Integration (VLSI) Systems, vol. 23, Issue: 5. https://ieeexplore.ieee.org/stamp/stamp.jsp?tp=&arnumber=6825872 (Year: 2014).*

"U.S. Appl. No. 15/979,072, Corrected Notice of Allowability dated Nov. 29, 2018", 2 pgs.

"U.S. Appl. No. 15/975,539, First Action Interview—Office Action Summary dated Dec. 10, 2018", 4 pgs.

"U.S. Appl. No. 15/975,615, Notice of Allowance dated Dec. 10, 2018", 12 pgs.

"U.S. Appl. No. 15/980,179, Response filed Dec. 21, 2018 to First Action Interview—Office Action Summary dated Oct. 26, 2018", 20 pgs.

"U.S. Appl. No. 16/190,073, Preliminary Amendment filed Dec. 28, 2018", 9 pgs.

U.S. Appl. No. 14/997,113, filed Jan. 15, 2016, Cryptographic ASIC Including Circuitry-Encoded Transformation Function.

U.S. Appl. No. 15/975,539, filed May 9, 2018, Cryptographic ASIC for Derivative Key Hierarchy.

U.S. Appl. No. 15/975,615, filed May 9, 2018, Cryptographic ASIC for Key Hierarchy Enforcement.

U.S. Appl. No. 15/979,072, filed May 14, 2018, Cryptographic ASIC With Autonomous Onboard Permanent Storage.

U.S. Appl. No. 15/980,179, filed May 15, 2018, Cryptographic ASIC With Onboard Permanent Context Storage and Exchange.

U.S. Appl. No. 15/994,877, filed May 31, 2018, Cryptographic ASIC With Unique Internal Identifier.

U.S. Appl. No. 15/994,938, filed May 31, 2018, Cryptographic ASIC With Self-Verifying Unique Internal Identifier.

"U.S. Appl. No. 14/997,113, Response filed Oct. 11, 2018 to Final Office Action dated Apr. 11, 2018 and Advisory Action dated Aug. 28, 2018", 24 pgs.

"U.S. Appl. No. 15/975,615, Examiner Interview Summary dated Oct. 23, 2018", 3 pgs.

"U.S. Appl. No. 15/979,072, Notice of Allowance dated Oct. 23, 2018", 10 pgs.

"U.S. Appl. No. 15/980,179, First Action Interview—Office Action Summary dated Oct. 26, 2018", 3 pgs.

"U.S. Appl. No. 15/994,877, Examiner Interview Summary dated Oct. 23, 2018", 3 pgs.

"U.S. Appl. No. 15/994,877, Preliminary Amendment filed Nov. 5, 2018", 10 pgs.

"U.S. Appl. No. 15/994,938, Response filed Oct. 14, 2018 to First Action Interview Pre-Interview Communication dated Sep. 14, 2018", 15 pgs.

"U.S. Appl. No. 15/994,938, Preliminary Amendment filed Nov. 14, 2018", 12 pgs.

"U.S. Appl. No. 14/997,113, Advisory Action dated Aug. 28, 2018", 5 pgs.

"U.S. Appl. No. 14/997,113, Examiner Interview Summary dated Dec. 19, 2017", 3 pgs.

"U.S. Appl. No. 14/997,113, Final Office Action dated Apr. 11, 2018", 35 pgs.

"U.S. Appl. No. 14/997,113, Non Final Office Action dated Oct. 10, 2017", 31 pgs.

"U.S. Appl. No. 14/997,113, Response filed Mar. 12, 2018 to Non Final Office Action dated Oct. 10, 2017", 24 pgs.

"U.S. Appl. No. 14/997,113, Response filed Aug. 8, 2018 to Final Office Action dated Apr. 11, 2018", 22 pgs.

"U.S. Appl. No. 15/975,539, First Action Interview—Pre-Interview Communication dated Aug. 7, 2018", 4 pgs.

"U.S. Appl. No. 15/975,539, Preliminary Amendment filed Sep. 20, 2018", 17 pgs.

"U.S. Appl. No. 15/975,539, Response filed Sep. 7, 2018 to First Action Interview—Pre-Interview Communication dated Aug. 7, 2018", 17 pgs.

"U.S. Appl. No. 15/975,615, Non Final Office Action dated Jul. 23, 2018", 12 pgs.

"U.S. Appl. No. 15/979,072, First Action Interview—Pre-Interview Communication dated Aug. 3, 2018", 3 pgs.

"U.S. Appl. No. 15/979,072, Preliminary Amendment filed Oct. 1, 2018", 10 pgs.

"U.S. Appl. No. 15/979,072, Response filed Sep. 3, 2018 to Pre-Interview Communication dated Aug. 3, 2018", 5 pgs.

"U.S. Appl. No. 15/980,179, First Action Interview—Pre-Interview Communication dated Sep. 7, 2018", 4 pgs.

"U.S. Appl. No. 15/994,877, First Action Interview—Pre-Interview Communication dated Sep. 4, 2018", 4 pgs.

"U.S. Appl. No. 15/994,938, First Action Interview—Pre-Interview Communication dated Sep. 14, 2018", 4 pgs.

"International Application Serial No. PCT/US17/13377, International Search Report dated Apr. 18, 2017", 2 pgs.

"International Application Serial No. PCT/US17/13377, Written Opinion dated Apr. 18, 2017", 7 pgs.

"International Application Serial No. PCT/US2017/013377, International Preliminary Report on Patentability dated Feb. 13, 2018", 8 pgs.

"International Application Serial No. PCT/US2017/013377, Response filed Nov. 13, 2017 to Written Opinion dated Apr. 18, 2017", 4 pgs.

"U.S. Appl. No. 15/979,072, Notice of Allowability dated Jan. 4, 2019", 2 pgs.

"U.S. Appl. No. 15/994,877, Notice of Allowance dated Jan. 17, 2019", 7 pgs.

"U.S. Appl. No. 14/997,113, Notice of Allowance dated Jan. 31, 2019", 16 pgs.

"U.S. Appl. No. 15/975,539, Response filed Feb. 11, 2019 to First Action Interview dated Dec. 10, 2018", 15 pgs.

"U.S. Appl. No. 15/994,938, First Action Interview—Office Action Summary dated Feb. 14, 2019", 4 pgs.

"U.S. Appl. No. 14/997,113, Corrected Notice of Allowability dated Feb. 21, 2019", 2 pgs.

* cited by examiner

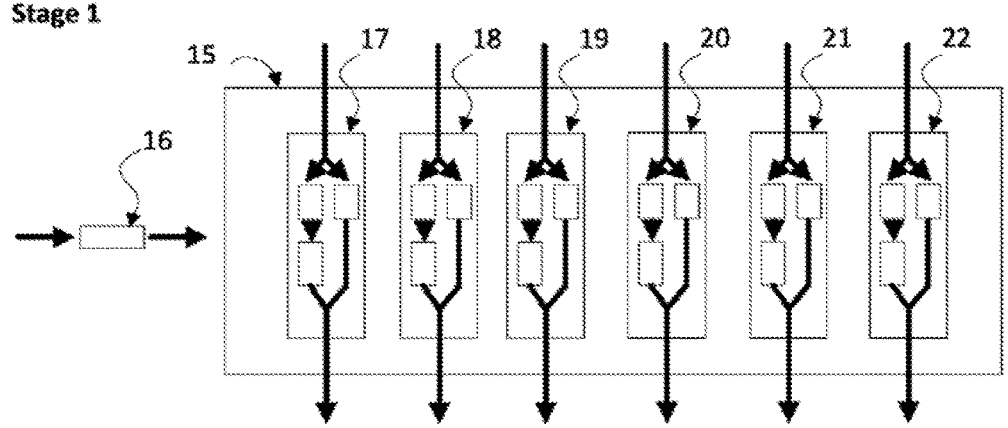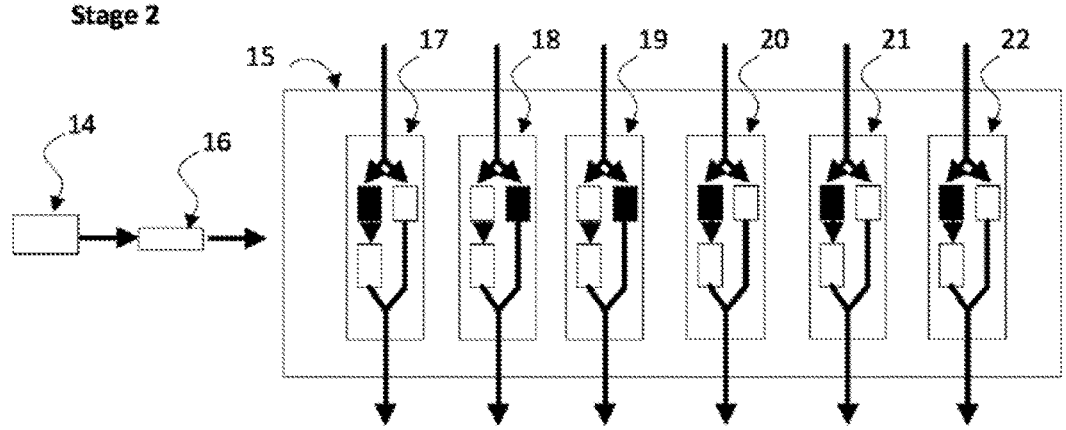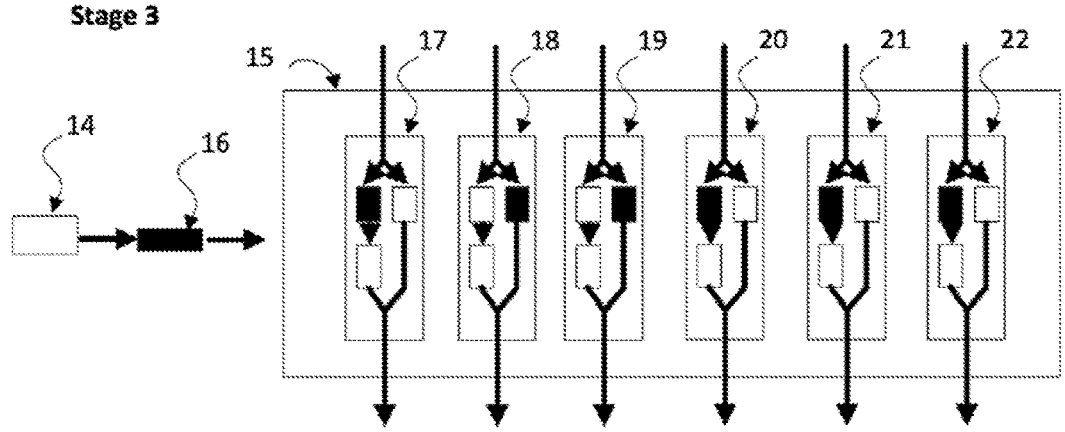
FIG. 6

CRYPTOGRAPHIC ASIC WITH COMBINED TRANSFORMATION AND ONE-WAY FUNCTIONS

RELATED APPLICATIONS

This application claims the priority benefit of provisional application U.S. Ser. No. 62/645,609, filed on Mar. 20, 2018, and entitled "CRYPTOGRAPHIC ASIC WITH COMBINED TRANSFORMATION AND ONE-WAY FUNCTIONS," which is hereby incorporated by reference in its entirety. This application is related by subject matter to U.S. Ser. No. 14/997,113, filed on Jan. 15, 2016, published on Jul. 20, 2017 as U.S. Patent Application Publication 2017/0206382A1, and entitled "CRYPTOGRAPHIC ASIC INCLUDING CIRCUITRY-ENCODED TRANSFORMATION FUNCTION," which is hereby incorporated by reference in its entirety.

TECHNICAL FIELD

The disclosed technology relates generally to the design of integrated electronic circuits, and more particularly, some embodiments relate to the design of cryptographic integrated circuits.

BACKGROUND

Application-specific integrated circuits (ASICs) are integrated circuits designed and built to serve a particular purpose or application. ASICs provide fast computational speed compared with slower, more generalized solutions, such as software solutions running on general-purpose processors or field programmable gate arrays (FPGAs). As the name implies, ASICs are generally designed to perform only one specific application, resulting in a trade-off between flexibility and computational speed. ASICs are increasing in importance in cryptography-related fields, such as proof-of-work systems, digital rights management systems, and other applications generally having stringent speed and efficiency requirements.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 6 illustrates an example function coding process in accordance with embodiments of the technology disclosed herein.

Figure 1:
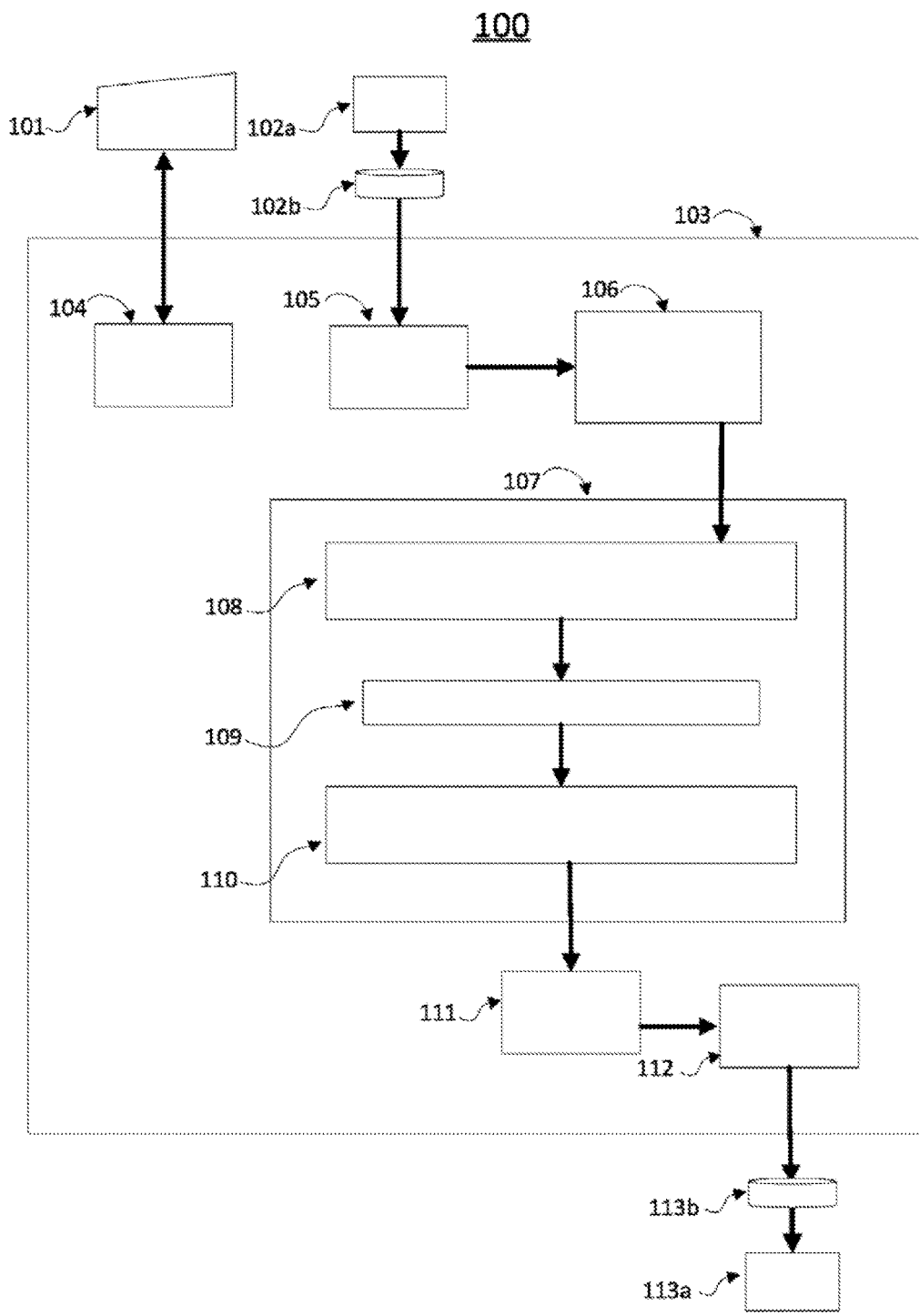
FIG. 1 illustrates an example cryptographic processing system within which embodiments of the technology disclosed herein may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

According to various embodiments of the disclosed technology, an integrated circuit is provided for use in proof-of-work based cryptographic verification processes, including but not limited to the cryptographic network transaction verification systems often used in the emerging field of blockchain technology. The integrated circuit includes one or more blocks of circuitry implementing a cryptographic function, generally a cryptographic one-way function (OWF) that is hard to reverse, such as a secure hashing algorithm. One or more transformation functions selected by one or more users and embodied as blocks of datapath circuitry are placed on the integrated circuit datapath at a point prior to at least one of the blocks of circuitry implementing a cryptographic function described above. Each block of circuitry implementing the transformation function may be configured to be programmed by the user by supplying a configuration key, for example, a key composed of a string of binary digits. Such a key is then embodied as datapath circuitry within the transformation block.

Following such programming, the circuitry within the transformation block will effect a specific programmatic transformation reflecting the key programmed by the user on the data it receives from circuitry prior to it along the integrated circuits datapath, and pass transformed data onto further circuitry along the datapath. Thus, and regardless of the content of the data received by the transformation block, the transformation it applies will directly and consistently affect the final value calculated by circuitry further along the datapath, including the blocks or blocks of circuitry implementing a cryptographic function described above.

Due to interaction of the transformation with the mathematical properties of the cryptographic algorithms involved, particularly their nature as OWFs that are hard to revert (here, and at other points in this document, terms such as "hard" and "easy" may be understood in the sense of computational complexity theory, particularly polynomial time theory), the combined effect is to produce a systemic transformation of the bits contained in the final value calculated by the circuit that is not easily deciphered, not easily distinguishable from noise, and not easily replicable by a party lacking full prior knowledge of the user's key or keys, but yet is fully consistent and easily replicable and thus verifiable by a party with prior knowledge of the keys or access to the means to utilize them in calculation even while lacking knowledge of them (such as, a party in possession of an ASIC programmed to embody the keys within its datapath circuitry).

Generally, candidate transaction block headers will be subjected to one or several hashing operations, and the resulting hash value will be compared to certain preexisting criteria for validity. In the case of bitcoin, the particular hashing operations used happen to be two subsequent applications of the 256-bit version of the $2^{nd}$ version of the Secure Hashing Algorithm (SHA), as defined by the National Institute for Standards in Technology (NIST). This is sometimes referred to as SHA-256, and two sequential applications of it are sometimes referred to as double SHA-256. For simplicity, it may sometimes also referred to as double SHA. However, it is worth nothing that this is merely the specific algorithm that happens to be used in the case of bitcoin; other blockchains can and do use other algorithms. Similarly, various embodiments of the technology described herein can use various different algorithms within the field of blockchain technology, while other embodiments are applicable to fields other than blockchain technology.

As is common in other uses of proof-of-work verification systems, the comparison of candidate results with the validity criteria determines further processing. If the candidate transaction block header fails to pass the validity criteria, it is discarded and the system moves on to processing the next candidate transaction block header. If the candidate transaction block header passes the validity criteria then it is considered a valid transaction block header.

When a valid transaction block header is found, a series of other operations are performed. Within the field of blockchain technology, such operations generally culminate in the appending of the valid transaction block header to the end of the blockchain, along with the block of transactions it references. Other operations, such as the dispensing of a reward to the party that first reported the discovery of the valid transaction block header may also occur. Subsequently, the search for a new valid transaction block header begins anew and the process repeats.

Generally, technology for solving the computationally intensive proof-of-work calculations involved in blockchain systems has evolved rapidly in recent years. For example, in the case of bitcoin transactions, the proof-of-work process involved in discovering valid transaction block headers was originally was conducted utilizing software applications running on general-purpose processors. However, speed and efficiency are paramount in proof-of-work systems, including those used within the context of blockchain systems. Accordingly, bitcoin mining operations have moved toward specialized hardware solutions, including ASICs. ASICs provide profound increase in speed and efficiency arising from the line-level speed with which calculations may be conducted. As the name implies ASICs are designed and fabricated to perform one specific application, in this case the mathematical operations involved in implementing a specific cryptographic protocol.

The success of the bitcoin network has evidenced the secure nature of blockchain technology. Accordingly, the use of blockchains in other related fields has gained interest over time. However, ASICs are designed to narrowly match specific elements of the protocol within which they are to be implemented, specifically the elements of the protocol describing the particulars of the proof-of-work system defined by the protocol. For the bitcoin network, each ASIC is designed assemble at great speed block headers as described by the bitcoin protocol, subject them to two consecutive instances of the 256-bit version of the Secure Hashing Algorithm (SHA-256) protocol, and finally check the validity of the resulting 256 bit binary hash value by comparing it to a pre-determined validity test.

Embodiments of the technology disclosed herein are directed toward the design, fabrication and utilization of application specific integrated circuits for cryptography-related applications. More particularly, various embodiments of the technology disclosed herein relate to ASICs having one or several programmable transformation functions embodied as circuitry incorporated into the integrated circuit's high speed datapath. By encoding transformation function as datapath circuitry, embodiments of the technology disclosed herein enable ASICs to implement any one of a very broad range of proof-of-work systems as selected by the user.

In one embodiment, a cryptographic integrated circuit comprising a combined transformation/hashing block and a programming circuit are provided. The combined transformation/hashing block comprises a set of electronic circuitry that is programmable after the manufacture of the integrated circuit to perform a transformation operation and a hashing operation on input data to produce and store output data. The programming circuit communicatively couples the combined transformation/hashing block and a configuration interface. The combined transformation/hashing block is configured to be programmed through the configuration interface based on a configuration key, and alters internal state variable values of the hashing operation according to the transformation operation.

In an embodiment, a cryptographic method comprises receiving a configuration key from a user, programming a transformation function based on the configuration key, performing a hashing operation on input data including altering internal state variable values of the hashing operation based on the programmed transformation function, and outputting the result of the transform-enabled hashing operation.

In another embodiment, a non-transitory computer-readable storage medium has embedded therein a set of instructions which, when executed by one or more processors of a computer, causes the computer to execute cryptographic operations. The operations may include receiving a configuration key from a user, programming a transformation function, based on the configuration key, performing a hashing operation on input data including altering internal state variable values of the hashing operation based on the programmed transformation function, and outputting the result of the transform-enabled hashing operation.

FIG. 1 illustrates an example of cryptographic network transaction verification system 100 of a general type commonly used for blockchain applications and incorporating an integrated circuit 103 designed for this application within which embodiments of the technology disclosed herein may be implemented.

For ease of discussion, the elements and overall operation of the example cryptographic processing system 100 will be described with respect to the bitcoin protocol, and the network supporting the bitcoin blockchain. Although described in this manner, one of ordinary skill reading the present disclosure would appreciate that the example cryptographic network transaction verification system 100 is applicable to uses other than the bitcoin network.

The example cryptographic network transaction verification system 100 includes an integrated circuit 103. In various embodiments, the integrated circuit 103 may include one or more processing components, including a configuration interface 104, a transaction block header framer 105, a buffer 106, a cryptographic hashing core 107, an evaluator 111, and a decision engine 112. In some embodiments one or more components may be combined into a single integrated circuit, as is illustrated in FIG. 1, where all components represented within integrated circuit 103 are physically part of the same integrated circuit (that is, are all crafted within the same piece of silicon). In other embodiments some of them may be crafted out of different pieces of silicon and combined together by means of connecting circuitry. Each of the components are discussed in detail with respect to the example cryptographic processing system 100.

A user 101 may configure one or more integrated circuit parameters through the configuration interface 104. Non-limiting examples of integrated circuit parameters that may be configured by the user 101 include: initialization; internal clock speed; or mode of communication with other networked systems; among others. In some embodiments, the user 101 may be a human communicating with the integrated circuit 103 via a terminal. In other embodiments, the user 101 may be an automated process running on a system or network. In various embodiments, the configuration interface 104 may also be used by the user 101 to monitor operation characteristics of the integrated circuit 103. Non-limiting examples of operational characteristics that may be monitored and provided to the user 101 may include: current activities; operating temperature; operating voltage; or fault status; among others.

Each candidate transaction block header that is subsequently processed by integrated circuit 103 is assembled by the transaction block header framer 105 using a combination of data generated by the framer itself and data obtained from the transaction and system data 102b. In various embodiments the transaction and system data 102b is compiled by a prior process, the mining software 102a. In many cases mining software 102a is a piece of software running on a general purpose processor and communicating with the rest of the blockchain network via a connection to the public internet, which it utilizes to compile the transaction and system data 102b.

Certain qualities of the overall architecture of blockchain systems, particularly the well-designed compartmentalization between different aspects of the system, provides effective isolation between the operations of the integrated circuit 103 and the particulars regarding the operations of the mining software 102a. As a result, most particulars regarding the operations of the mining software including where it physically resides, what procedures it uses to communicate with the rest of the network, what procedures it uses to compile network data into the transaction and system data 102b, and others are transparent to the operations of the integrated circuit 103. Similarly, whether the network that the mining software 102a connects to happens to be the bitcoin network or a different network responsible for the maintenance of a different blockchain is also transparent to the integrated circuit 103, and to various embodiments of technology described herein.

The transaction and system data 102b may include, for example: system date and time; protocol version; a Merkle-Damgård construct representing the group of individual transactions that included in the transaction block; a unique identifier of the most recent block to be appended to the blockchain; among others. Upon receiving the transaction and system data 102b, the transaction block header framer 105 further elaborates it in order to generate one or more candidate transaction block headers.

In various embodiments, the transaction block header framer 105 may parse the transaction and system data 102b and add to it certain other elements, such as a sequential counter in order to generate a series of transaction block headers that are all validly formed and all appropriately represent the same set of transactions, but are all slightly different from each other.

In various embodiments, the rate at which the transaction block header framer 105 may produce transaction block headers that all accurately represent a block of transactions as received from the transaction and system data 102b but are all slightly different from each other may be fast, in the range of several billion or several hundred billion individual candidate transaction block headers per second. Depending on the implementation, a buffer 106 may store created candidate transaction block headers awaiting processing by the hashing core 107.

Each integrated circuit 103 may contain one or more hashing cores or other cryptographic processing cores. For simplicity, the example cryptographic processing system 100 is shown including a single hashing core 107. In various embodiments, multiple parallel hashing or other cryptographic processing cores may be implemented. The hashing core 107 includes one or more hashing blocks. In the example illustrated in FIG. 1, the hashing core 107 includes two hashing blocks 108, 110. A hashing block may be configured as a set of circuitry that executes the mathematical operations defined by the applicable hashing standard. In various embodiments, the hashing core 107 may embody a common hashing standard, such as for example the Secure Hashing Algorithm (SHA). In some embodiments, the 256-bit version of SHA (SHA-256) may be used. In other embodiments, the hashing core 107 may include a single hashing block. Various embodiments may include greater than two hashing blocks.

In the illustrated embodiment of FIG. 1, each hashing block 108, 110 is designed to execute a sequence of mathematical operations in accordance with the SHA-256 standard. The hashing core 107 processes each candidate transaction block header in accordance with the cryptographic standard implemented. In some embodiments, a first hashing block 108 may accept the candidate transaction block headers generated by the transaction block header framer 105 as an input and subject them to a mathematical operation defined by a standard hashing algorithm. The first hashing block 108 outputs a first hash value 109 for each candidate transaction block header it receives from the transaction block header framer 105. Each first hash value 109 is associated with a given candidate transaction block header, acting as a type of "digital signature." In various embodiments, the first hash value 109 may be further processed by a second hashing block 110. This is a representation of the double hashing operation, such as that utilized within the bitcoin network. In some embodiments, the second hashing block 110 may implement the same cryptographic operation as the first hashing block 108. In various embodiments, the second hashing block 110 may implement a different cryptographic operation than the first cryptographic hashing block 108.

The output of the hashing core 107 is compared with the pre-existing criteria for identifying a valid block. In various embodiments, the output of the hashing core 107 may be the output from the second hashing block 110. An evaluator 111 of the integrated circuit 103 takes the final hash value output by the hashing core 107 for each candidate transaction block header and checks to see whether the processed output meets the pre-determined validity criteria. In the particular case of the bitcoin network, the validity criteria is expressed by a certain numeric value (often referred to as the difficulty level) that the numeric value of the 256 bit number produced by the final hash output may not exceed if it is to be considered valid. Thus if the numeric value or the final hash exceeds the difficulty level by any amount, the candidate transaction block header fails the validity test, and if it does not exceed the difficulty level it passes the validity test. In blockchain systems other than the one associated with the bitcoin network, some embodiments may employ the same criteria for determining validity, while other embodiments may employ different criteria for determining validity.

If the evaluator 111 determines that the final hash value does not meet the validity criteria, the decision engine 112 may discard the candidate transaction block header associated with the processed output evaluated by the evaluator 111. If the evaluator 111 determines that the final hash value does meet the validity criteria then the decision engine 112 will report that fact externally via a success report 113b transmitted to a success report recipient 113a. A success report 113b along with other information associated with it, such as the transaction block headers associated with it and other items, is the cryptographic proof-of-work that the system as a whole is designed to produce.

In various embodiments the success report recipient 113b may be the same as the mining software 102a. In other embodiments the success report recipient 113b may be a different process than the mining software 102a. Upon receipt of the success report 113b, the success report recipient 113a may take a number of subsequent actions. In various embodiments, such actions generally relate to the communication of the discovery of a valid transaction block header to the rest of the network, and generally culminate with the appending of a new transaction block to the end of the blockchain and the start of the search for the next valid block of transactions. In the specific case of the bitcoin network, such actions may additionally include other aspects such as the dispensing of a reward to the first party to report the discovery of a new valid transaction block header, and others.

However, and as was the case with the prior description regarding the operations mining software 102a, it is worth noting that exact nature of the success report recipient 113b and the specifics regarding what actions it may or may not take following the receipt of the success report 113a are transparent to various embodiments of the technology described herein. Similarly, whether the success report recipient 113b communicates with the network associated with the maintenance of the blockchain underlying bitcoin or the network associated with the maintenance of a different blockchain is transparent to some embodiments of the technology described herein.

With the basic workflow of blockchain technology described with respect to an example implementation, embodiments of the technology disclosed herein will be discussed with reference to the example cryptographic processing system 100 of FIG. 1. For ease of discussion, the embodiments will be discussed with respect to bitcoin and the blockchain implementation associated with it. As discussed above, one of ordinary skill in the art reading this description, however, would appreciate that the embodiments described herein are applicable to many other related fields.

Figure 2:
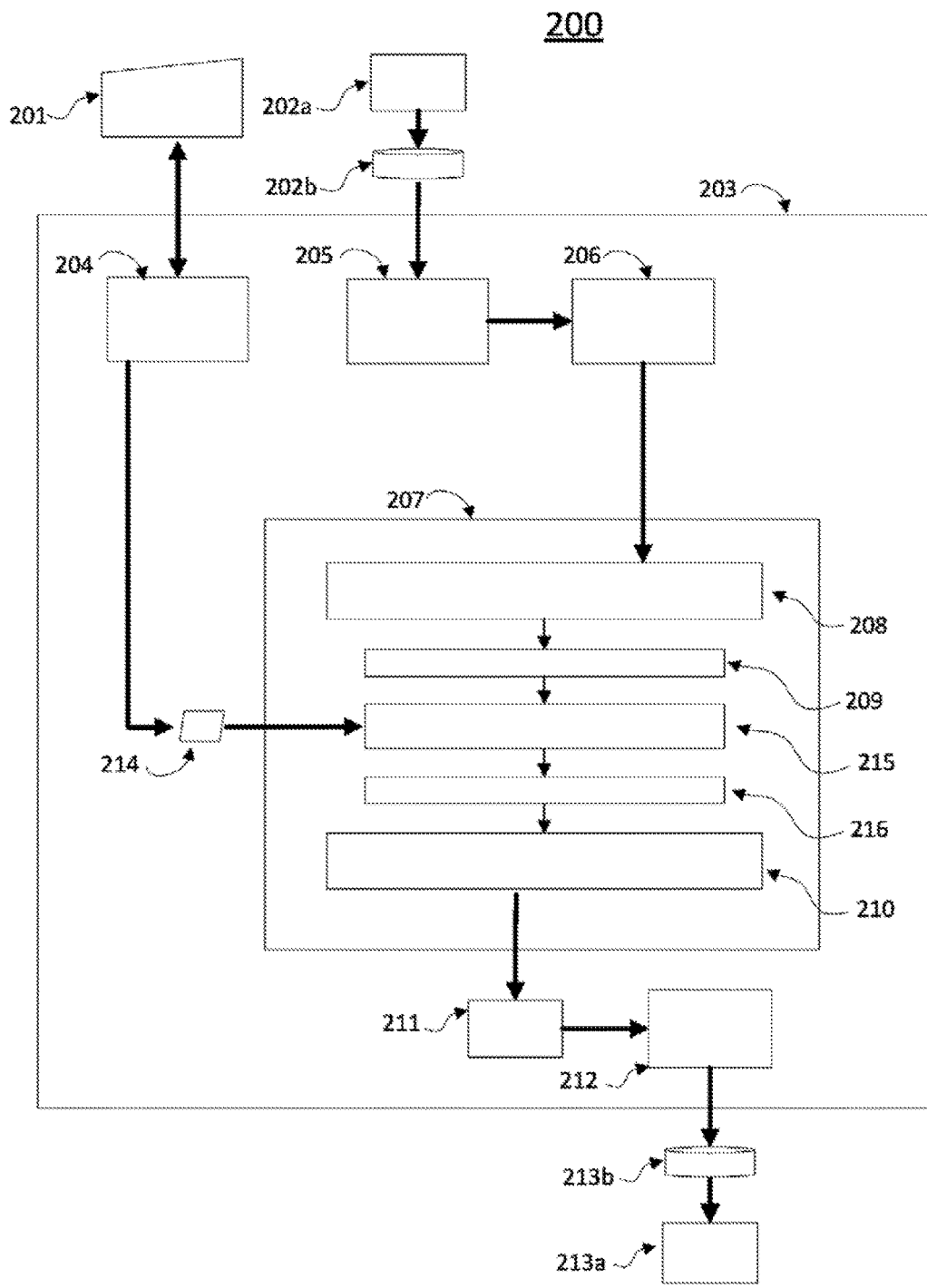
FIG. 2 illustrates an example transform-enabled integrated circuit in accordance with embodiments of the technology disclosed herein and containing a programmable transform block located at one of the points along the integrated circuits datapath contemplated as part of the technology disclosed herein.

FIG. 2 illustrates an example transform-enabled integrated circuit 203 in accordance with embodiments of the technology disclosed herein. The example transform-enabled integrated circuit 203 is implemented within a cryptographic processing system 200, similar to the system 100 described with respect to FIG. 1. The transform-enabled integrated circuit 203 may include a configuration interface 204, a transaction block header framer 205, a buffer 206, a cryptographic processing core 207, an evaluator 211, and a decision engine 212, similar to the components discussed above with respect to the integrated circuit 103 of FIG. 1.

As discussed previously, embodiments of the technology disclosed herein place a transformation function embodied as circuitry within the cryptographic datapath of an integrated circuit 203. In the example illustrated in FIG. 2, the cryptographic processing core 207 of the transform-enabled integrated circuit 203 includes two hashing blocks 208, 210 and a programmable transformation block 215. Hashing blocks 208, 210 may be implemented to include a hashing or other cryptographic function such as, for example, circuitry to execute a hashing process in accordance with the SHA-256 standard.

In the illustrated example, the programmable transformation block 215 is a block of electronic circuitry specifically designed to be suitable for being integrated directly into the line-speed datapath of a high-performance cryptographic integrated circuit, but yet remain capable of being programmed to perform any one of a vast range of possible mathematical transform operations on input data it receives from circuitry prior to it on the integrated circuits datapath and output the resulting transformed data to circuitry subsequent to it on the integrated circuits datapath at full line speed.

In some embodiments such as that illustrated in FIG. 2 the programmable transformation block 215 is integrated into the datapath of the cryptographic processing core 207. The ASIC in this example is configured such that all components within cryptographic processing core 207 are arranged along a single highspeed datapath, there is a single point of input and a single point of output at either end of the datapath, and there is no external access to signals moving between the components comprising the cryptographic processing core 207.

The integration of the programmable transformation block 215 into the high-speed datapath within cryptographic processing core 207 allows the cryptographic processing core 207 to operate at line speed, and thus the circuit as a whole suffers from very little degradation in performance when compared to a cryptographic processing core not including the programmable transformation block 215. This is achieved by embodying a transformation function as datapath circuitry (i.e., the programmable transformation block 215), in a manner that will be disclosed in greater detail below.

Similarly, the arrangement of circuitry within cryptographic processing core 207 into a unified datapath protects the configuration key 214 from detection. The cryptographic processing core 207 contains a single input point and a single output point at either end, and has no external access to signals moving between the components comprising the cryptographic processing core 207. Therefore, the circuitry within the cryptographic processing core 207 (e.g., the programmable transformation block 215) is protected against disclosure or discovery of the configuration key 214 embodied in the programmable transformation block 215 by comparing the inputs and outputs produced by the different components arranged along the datapath.

In the specific case of the example embodiment illustrated in FIG. 2, the datapath within cryptographic processing core 207 is arranged in such a manner that the single input point for all data processed by the cryptographic processing core 207 is the first hashing block 208. From there, data such as transaction block headers proceeds along a datapath that takes it through the programmable transformation block 215, and then through the second hashing block 210. The second hashing block 210 is the single output point, and subsequently data leaves cryptographic processing core 207 and proceeds to the evaluator 211. Placing the programmable transformation block 215 before at least one hashing block (in this example, before hashing block 210) protects discovery of the configuration key 214 embodied in the programmable transformation block 215 via analytical techniques. For example, such placement protects discovery of the configuration key 214 through insertion of data known to produce a certain result upon being subjected to a particular set of cryptographic processes (e.g., double SHA-256 hashing), and then comparing the result produced by the transform-enabled cryptographic processing core 207 to deduce the configuration key 214.

Figure 3:
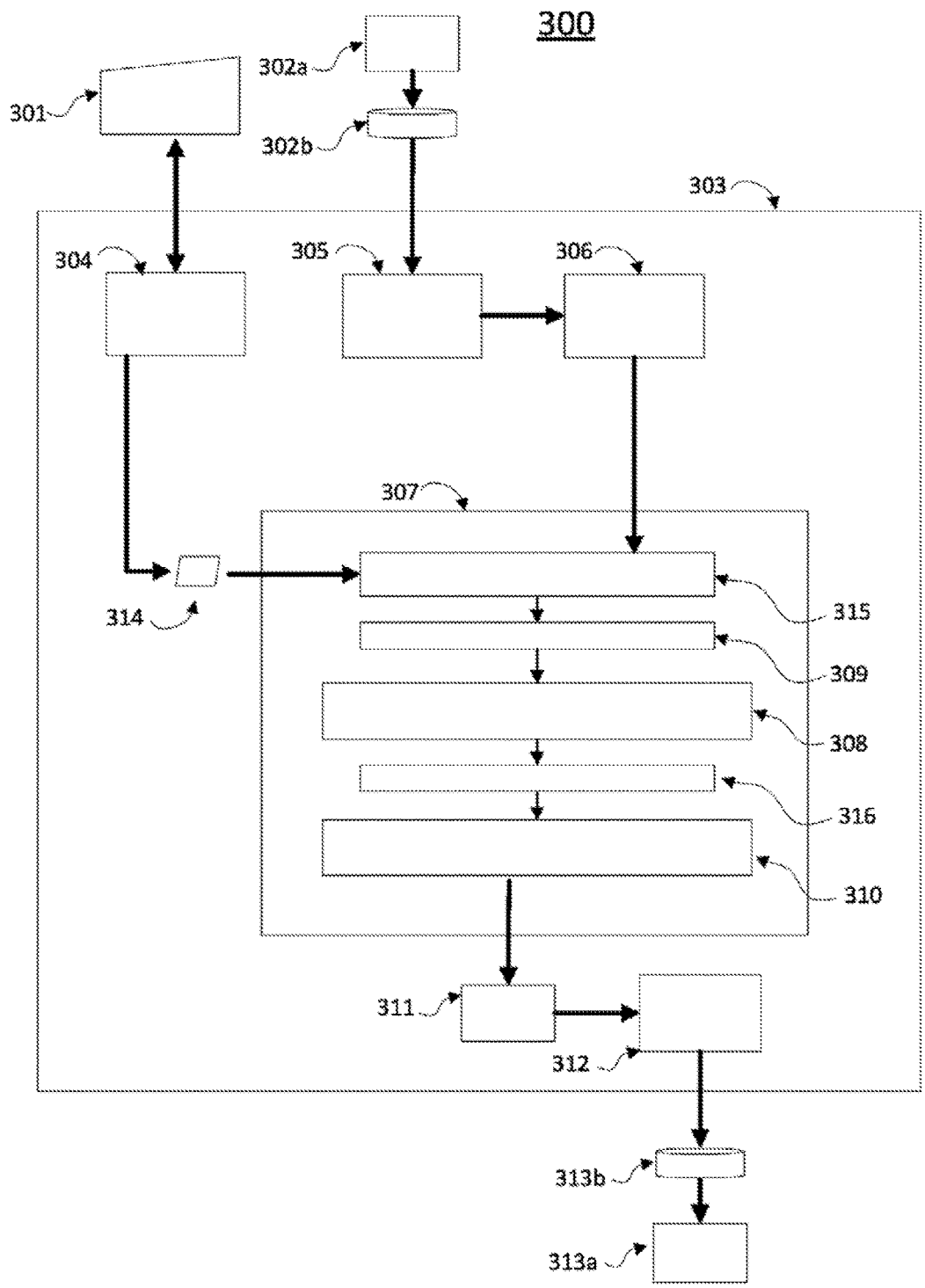
FIG. 3 illustrates an example transform-enabled integrated circuit in accordance with embodiments of the technology disclosed herein and containing a programmable transform block located at a different point along the integrated circuits datapath contemplated as part of the technology disclosed herein.

In other embodiments as will be discussed in greater detail below with reference to FIG. 3, the programmable transformation block 215 may be placed prior to the first hashing block 208, such that the single input point of the cryptographic processing core 207 is the programmable transformation block 215.

In various embodiments, the programmable transformation block 215 may be programmed at a time subsequent to the manufacturing of the transform-enabled integrated circuit 203 to consistently perform any one of a wide range of possible mathematical transformations on the data flowing through it at line speed due to its location on the datapath of the integrated circuit 203.

In some embodiments, the mechanism by which the programmable transformation block 215 is able to accept and retain such programming may be via a type of non-volatile read-only memory (NVRAM), including but not limited to Flash memory or other types of non-volatile memory. In various embodiments, the means of configuring the programmable transformation block 215 may be via one time programmable (OTP) circuitry components, including but not limited to micro-fuses or other types of OTP circuitry components. Micro-fuses are generally utilized in simple aspects of integrated circuit fabrication, such as writing manufacturing information onto integrated circuits during manufacture, or remedying faulty memory banks identified during testing. For ease of discussion, the technology of the present disclosure will be discussed with reference to a programmable transformation block 215 comprising micro-fuses.

Various embodiments of the transform-enabled integrated circuit 203 may enable configuring the programmable transformation block 215 by means of a configuration key 214. In various embodiments, the configuration key 214 may be coded into the programmable transformation block 215 by the user 201 acting through the configuration interface 204. In such embodiments, the technology disclosed herein contemplates several different parties potentially taking the role of the user 201 for the purpose of encoding the configuration key 214 into the programmable transformation block 215. Such parties may include, for example: at the factory by the IC manufacturer; by one or several end users; or by some combination of the above.

In some embodiments where the user 201 is a single party, the user 201 may provide a configuration key 104 defining what transformation is to be applied to each bit comprising the data received by the programmable transformation block 215. For example, where the programmable transformation block 215 is designed for a 256-bit system, the user 201 may input a configuration key 214 defining what transformation, if any, the programmable transformation block 215 applies to all 256 bits of data received. Therefore that party will have the freedom to program any one of the $2^{256}$ mathematical operations that the programmable transformation block 215 is capable of being configured to perform using a 256-bit key.

Similarly, and continuing with the 256 bit example above, in embodiments where the user 201 comprises one or more parties, the configuration of the programmable transformation block 215 may be carried out by each of the one or more users 201 each of whom contributes a part of the configuration key 214. Such a scheme may sometimes be referred to as a multi-key scheme, and the resulting key may sometimes be referred to as a multi-part key. In some embodiments, each of the one or more users 201 may configure what transformation, if any, the programmable transformation block 215 applies to a subset of the bits of data it receives, while in other embodiments each of the one or more users may contribute a partial key that is subsequently processed into a key in a manner that does not allow any one user to determine what transformation, if any, the programmable transformation block 215 is to apply to any one specific bit or bits of data it receives.

In various embodiments of the technology described herein where the programmable transformation block 215 is placed in front of at least one block of circuitry implementing a cryptographic OWF such as the second hashing block 210 implementing a standard cryptographic algorithm in the illustration, the combined effect of the interaction of the programmable transformation function 215 and certain mathematical properties of the cryptographic algorithms involved, particularly their nature as OWFs that are hard to revert (here the terms "hard" and "easily" may be understood in the sense of computational complexity theory, particularly polynomial time theory) produce certain specific results. Specifically, the combined effect is that even a slight change introduced by the programmable transformation block 215, such as single bit change, will result in a wholesale transformation of the bits contained in the final value calculated by the hashing core 207 that is not easily deciphered, not easily distinguishable from noise, and not easily replicable by a party lacking full prior knowledge of the configuration key 214 and specific aspects of the design of the programmable transformation function 215, but yet is fully consistent and easily replicable and thus verifiable by a party with such knowledge or access to the means to utilize them in calculation even while lacking knowledge of them (such as, a party in possession of the same ASIC, or another ASIC incorporating the technology described herein and programmed to same configuration key 214 within its datapath circuitry).

In some embodiments, the programmable transformation block 215 may be configured to enable an end user to program a variety of transformation schemes, such as transposition schemes that transpose the position within the input and output of certain specific bits, while leaving others unchanged. In various embodiments, the programmable transformation block 215 may be configured to perform a direct bit inversion transformation scheme where some bits are inverted while others remain unchanged.

For ease of discussion, the technology of the present disclosure will be discussed with reference to a direct bit inversion transformation scheme where a 256-bit configuration key 204 determines what transformation is to be applied to each one of the 256 bits received by the programmable transformation block 215 by means of the following code: bits received at positions where the 256 bit configuration key contained a value of "0" are to be treated in one manner (for instance, be left unchanged), while those received at positions where the 256-bit configuration key contains a value of "1" are to be treated in a different manner (for instance, be inverted).

Following the production of the final hash value by the second hashing block 210, the evaluation process carried out by the evaluator 211 and the decision engine 212 in FIG. 2 is similar to that described with respect to FIG. 1. The first step in the process is that the evaluator 211 will determine whether the final hash value produced by a particular transaction block header does or does not meet the validity criteria.

If the final hash value does not meet the validity criteria (as will generally be the case in the vast majority of cases), the final hash value and the transaction block header that produced it will both be discarded. If the final hash value does meet the validity criteria, the final hash value and the transaction block header that produced the final hash value will be passed to the decision engine 212. After receiving the success indication, the decision engine 212 may then issue a success report 213b to the success report recipient 213a. Additionally, and also discussed with respect to FIG. 1, the success report recipient 213a may or may not be the same as the mining software 202a.

What is different is that the inclusion of the programmable transformation block 215, its subsequent programming by the user with a certain configuration key 214, and the interaction of the resulting transformed data with the second hashing core 210 may have caused a change in the final hash value calculated by the hashing core 203 for one or more than one transaction block headers generated by the transaction block header framer 205 and passed on the evaluator 211. Further, and as was discussed previously, such changes have certain unique and useful mathematical properties. Given that the task of the evaluator 211 is to compare the hash values received from the hashing core 203 with certain pre-determined validity criteria and on that basis evaluate whether the hash values pass or fail the validity test, it follows that a change in the hash value received by the evaluator 211 may result in a change that the evaluator makes as to the validity or non-validity of the hash value received.

In various embodiments there may be one or several null configuration key 214 values which, if programmed into the programmable transformation block 215 will cause the programmable transformation block 215 to effect no change in the information passing through it, and thus cause the presence of the programmable transformation block 215 to effect no change in the final hash value that is calculated by the cryptographic processing core 207 for each of the transaction header blocks received from the transaction block header framer 205 and passed on to the evaluator 211. In some embodiments, a null configuration key may be represented by a sting of zeroes of the same length as the length of the configuration key, which in certain embodiments may be 256 bits in length.

In various embodiments incorporating one or several null keys, the overall effect of programming the programmable transformation function with a null key is such that the set of transaction block header hashes considered valid by the evaluator would not be altered, rendering the output from the cryptographic processing core 207 functionally identical to the output from the hashing core 107 discussed with respect to FIG. 1. That is, a transform-enabled integrated circuit incorporating the technology described herein and programmed with a null key would behave in produce the same results as an integrated circuit not incorporating the technology described herein, and thus be suitable to perform proof-of-work calculations within the context of the same proof-of-work systems, including but not limited to the cryptographic network transaction verification of bitcoin transaction (also referred to as bitcoin mining). This aspect of the technology described herein has commercial implications, as it enables the use of integrated circuits incorporating embodiments of the technology described in the present disclosure to be useful for the purpose of mining bitcoin, in addition to being useful for a wide range of other applications.

In such embodiments, and in other embodiments not incorporating the figure of a null configuration key, the programming of the programmable transformation block 215 with a configuration key 214 different from the null configuration key will cause a change in the final hash value calculated by the cryptographic hashing core 207 for each of the candidate transaction block headers produced by the transaction block header framer 205 and passed on to the evaluator 211. This in turn will cause a change in what subset of all candidate transaction block headers are deemed to be valid by the evaluator 211 and thus further communicated to the decision engine 212, which will then communicated the outside of the integrated circuit 203 in the form of a success report 213b.

Further, and as described above, due to the interaction of the programmable transformation function 215 with certain mathematical functions of OWFs such as most standard modern cryptographic hashing functions, any change (including a single digit) in the input of a cryptographic hashing function causes a wholesale change in the resulting hash value that is not easily distinguishable from noise.

As noted above, in some embodiments the programmable transformation block 215 may be placed prior to the first hashing block, such that the single input point of the cryptographic processing core is the programmable transformation block. One such example of this is illustrated in FIG. 3. Referring now to FIG. 3, in this example arrangement, the transformation function embodied by the programmable transformation block 315 is applied to the transaction block headers prior to any hashing operation being applied by hashing blocks 308, 310. Although located in a different location in the example embodiment of FIG. 3, the location of programmable transformation block 315 within the datapath still meets the condition that it be placed prior to at least one hashing block (in that case, it is placed in front of the first hashing block 308 and the second hashing block 310). Thus, the embodiment illustrated by FIG. 3 is functionally similar to the embodiment illustrated in FIG. 2, and provides the same essential qualities, both as regards the properties of the results it produces and as regards the protection it provides against the discovery of configuration key 314 embodied within the programmable transformation block 315 via analytical techniques, such as described above.

Figure 4:
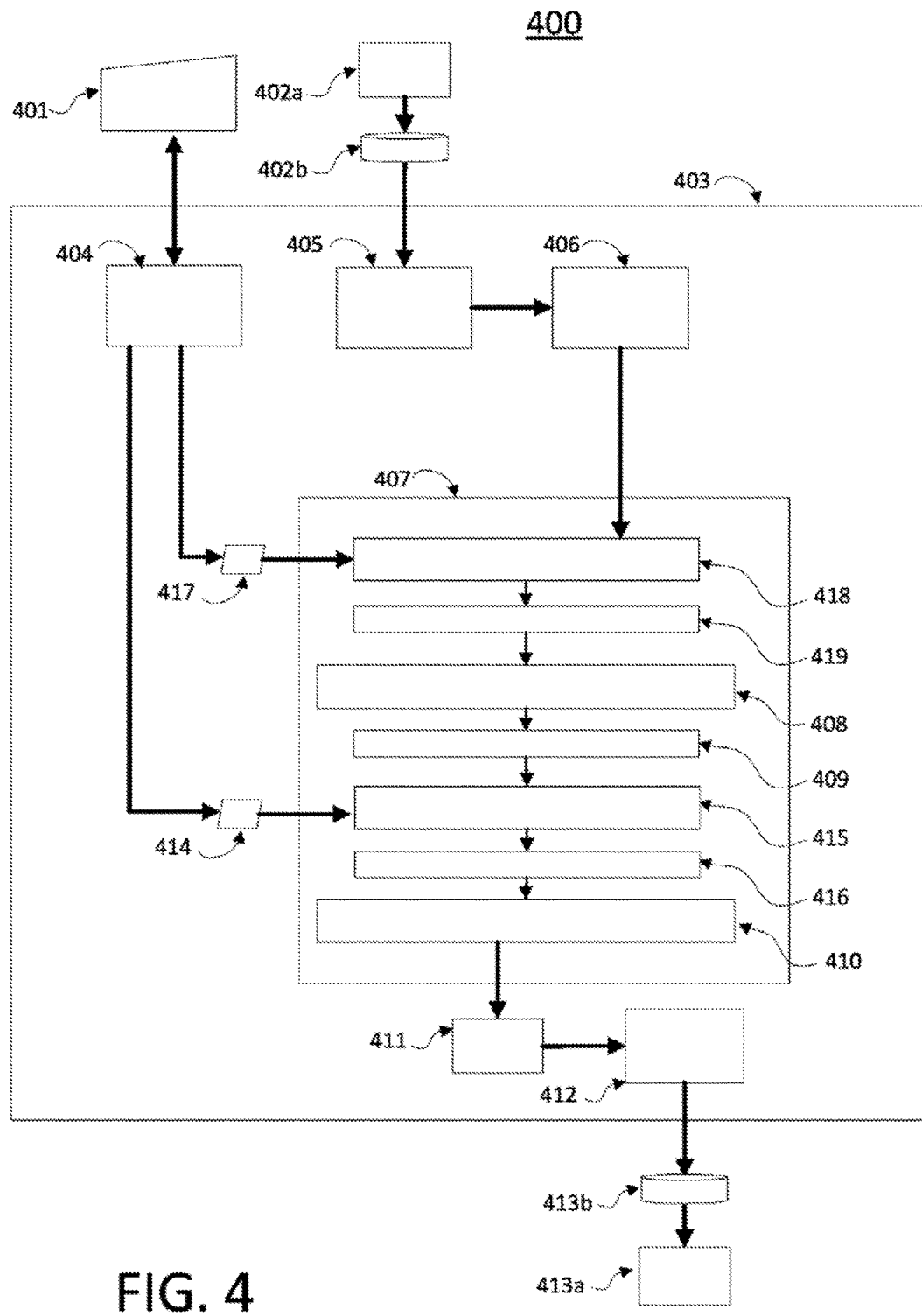
FIG. 4 illustrates an example transform-enabled integrated circuit in accordance with embodiments of the technology disclosed herein and containing two programmable transform blocks, both located at points along the integrated circuits datapath contemplated as part of the technology disclosed herein.

In some embodiments, a single integrated circuit may incorporate more than one programmable transformation block 215. FIG. 4 illustrates such an example transform-enabled integrated circuit 400. In such cases, embodiments may be implemented to provide more than one user with the ability to program a full configuration key.

Such embodiments implement a process that shares some characteristic with both cascade ciphers and multi-signature schemes but is distinct from both. Specifically, cascade ciphers involve the use sequential application of ciphers, that is, processes that encrypt data in such a manner it that at a later time it may be deciphered, that is, be rendered legible again. Various embodiments of the technology described herein as illustrated in FIG. 4 incorporate a similar concept of cascading, that is sequentially applying, cryptographic operations but do not involve the use of ciphers of any kind. Rather, they involve the sequential application transformations and OWFs (such as cryptographic hashing processes). OWFs are distinct from ciphers, among other aspects, in that their defining characteristic is that they be undecipherable rather than decipherable. Similarly, various embodiments of the technology described herein as illustrated in FIG. 4 in that their end product is a string of characters representing what may be thought of as multiple digital signatures applied to a digital document. However, the defining characteristic of digital signatures of any kind is that they may be validated by a party different from the signer, or one holding the signer's key. That is not the case of various embodiments of the technology described herein, which in that context may be thought of as a signature that may only be verified by the signer. Further, multi-signature schemes are often designed in such a way that each signature be distinct from the others, and may be individually verified. That again, is not the case for various embodiments of the technology described herein, which are specifically designed in such a manner that neither original signer is able to validate the signature without the presence of the other.

Thus, various embodiments of the technology described herein are distinct from both cascade ciphers, digital multi-signature schemes and other present cryptographic technologies. While lacking a common name due to its novelty, such a system may be described as a multi-key cascading transformed one-way function system.

In some embodiments where the cryptographic hashing algorithm embodied as circuitry in at least the second hashing block 410 may be a proven standard cryptographic hashing algorithm including, without limitation: SHA-2 in its various implementations; Keccak/SHA-3 in its various implementations; Skein in its various implementations; Grøstl in its various implementations; JH in its various implementations; and others, or be a non-standard hashing algorithms that, despite being non-standard, is still a OWF that is hard to reverse (where the term "hard" is understood in the sense of polynomial time theory). In such embodiments, the technology described herein as illustrated in FIG. 4 enables the implementation of a secure multi-key cascading transformed one-way function system, as described previously.

In some embodiments, both the first and second programmable transformation blocks 418, 415 may be programmed by first and second configuration keys 417, 414 that are 256 bits in length, while in other embodiments either one or both may be of a different length depending on the specifics of the implementation.

In various embodiments of the technology described herein also illustrated by FIG. 4, a first party that may be referred to as the primary authority may use the configuration interface 404 to program the first configuration key 417 which may referred to as the primary key into the first transformation block 418, which may be referred to as the primary transformation. Separately a second party that may be referred to as the secondary authority may use the configuration interface 404 to program the second configuration key 414 which may referred to as the secondary key into the second programmable transformation block 415, which may be referred to as the secondary transformation.

In certain embodiments of the technology described herein also illustrated by FIG. 4, one or both the primary authority and the secondary authority may be composed of several different parties. In some such embodiments the primary party as a whole may program the primary key as a multi-part key, while the secondary party as a whole may program the secondary key as a multi-part key. In other embodiments, either or both keys may be jointly configured by both the primary and the secondary parties as multi-part keys. In certain embodiments, the key programmed by the primary party, the secondary party, or both may be null keys. In other embodiments, the first and second programmable transformation blocks 418, 415 may be programmed by a single configuration key inputted by the user 401 through the configuration interface 404.

In other embodiments of the technology described herein not illustrated in FIG. 4, the process may be generally similar except that the configuration interface used by the primary authority may be different from the configuration interface used by the secondary authority. In some such embodiments, the configuration interface used by the primary authority may be created in such a manner as to be accessible during the manufacturing process of the integrated circuit but be inaccessible in the resulting finished parts, while the configuration interface used by the secondary authority may be structured in such a manner as to be accessible both during the manufacturing process and in the resulting finished parts. In other embodiments of the technology described herein, the relative accessibility or inaccessibility of each configuration interface may be structured differently.

In some embodiments of the technology described herein also not illustrated in FIG. 4, the process may be generally similar to that illustrated in FIG. 4 except that the design may incorporate more than two hashing rounds, or more than two programmable transformation functions, or both.

Figure 5A:
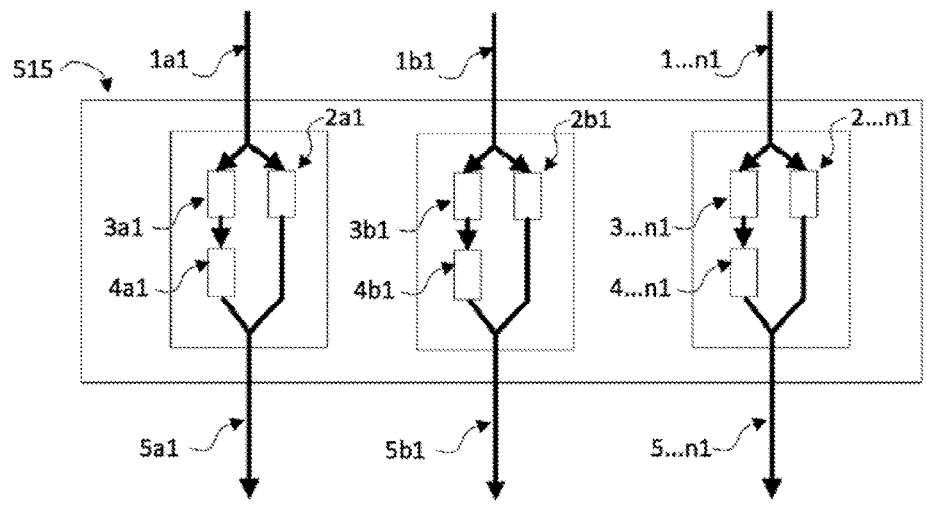
FIG. 5A illustrates an example programmable transform block configuration prior to coding the transformation function in accordance with embodiments of the technology disclosed herein.

FIG. 5A illustrates an example programmable transformation block 515 configuration prior to being coded in accordance with embodiments of the technology disclosed herein. The programmable transformation block 515 includes sets of programmable circuitry defining the transformation function represented by the configuration key 514 (illustrated in FIG. 5B). In various embodiments, the programmable transformation block 515 may be configured to enable one of a plurality of transposition operations, whereby one or more bits of input data (e.g., 1a1, 1b1, etc.) is transposed with another bit of the input data to generate a modified output data (e.g., 5a1, 5b1, etc.). In other embodiments, the programmable transformation block 515 may be configured to enable one of a plurality of direct bit inversion, or bit flipping, operations, whereby one or more bits of input data are flipped to generate modified output data.

Various embodiments utilizing a direct bit inversion transformation scheme as described herein may be implemented to take advantage of the fact that a 256 bit binary configuration key provides a succinct means to enable access to the full key space provided by the programmable transformation function 215. That is, 256 bits is the minimum length necessary to enable the user to specify which one among 256 distinct transformations is to be performed by the programmable transformation function 215 on the first hash value 209. Using a direct bit inversion transformation scheme may also enable the use of a minimal amount of new circuit elements to embody of the transformation function as datapath circuitry. This is important because the fact that the transformation function is embodied as datapath circuitry means that any additional circuitry placed on the datapath will operate at line speed and result in an overall degradation of the performance of the transform-enabled integrated circuit 203 as a whole.

A direct bit inversion transformation scheme may also provide a straightforward means to disable all effects of the programmable transformation 215 by simply setting all values in the 256 bit configuration key to zero. Such a key may be referred to as a null key. One result of this it simplifies the process of configuring a transform-enabled integrated circuit 203 so that it operates in a manner undistinguishable from that of a comparable integrated circuit not incorporating the programmable transformation function 215. The practical result of this is that integrated circuits incorporating the technology described herein may easily be configured to operate in the same manner as standard bitcoin mining ASICs and be used to mine bitcoins with no particular difficulty, (aside from and in addition to being able to operate in manners that are not replicable by bitcoin mining ASICs not incorporating the technology described herein).

For ease of discussion, FIGS. 5B and 6 will be discussed with reference to a direct bit inversion configuration.

Figure 5B:
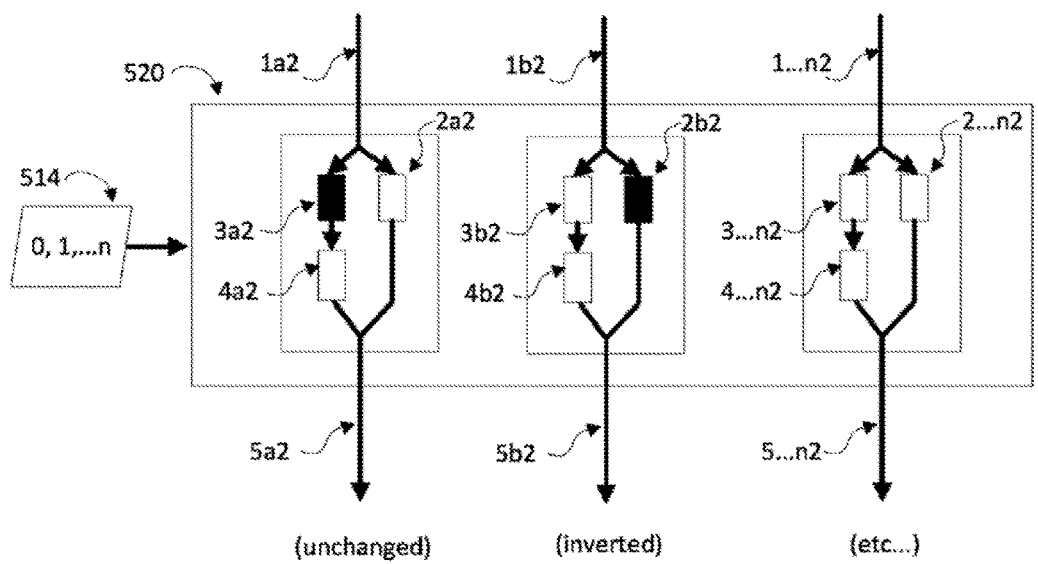
FIG. 5B illustrates an example programmable transform block coded according to a binary key in accordance with embodiments of the technology disclosed herein.

The coding of the programmable transformation block is illustrated in FIG. 5B. The example programmable transformation block 520 is shown being coded in accordance with the configuration key 514. To indicate the configuration key 514 embodied within the programmable transformation block 520, shaded boxes are used to indicate that a micro-fuse has been disabled (i.e., stopping data from flowing through the disabled micro-fuse). For example, in the illustrated example, when micro-fuse 3a2 is disabled, the input bit 1a2 flows through the programmable transformation block 520 unchanged. When micro-fuse 2b2 is disabled, the input bit 1b2 is inverted by the bit flipper 4b2 as it flows through the programmable transformation block 520.

FIG. 6 illustrates an example function coding process in accordance with embodiments of the technology disclosed herein. Stage 1 represents a programmable transformation block 15 in an uncoded state, similar to the programmable transformation block 515 of FIG. 5A. As illustrated, the programmable transformation block 15 is configured for a six-bit message. In other embodiments, the programmable transformation block 15 may be configured for input strings of any length, such as a length of 256 bits.

At Stage 2, the programmable transformation block 15 is coded, embodying the configuration key 14 as provided by the user. As illustrated, the configuration key 14 comprises the string "011000." The corresponding micro-fuses are disabled according to the configuration key 14, as illustrated by the shaded boxes within the programmable transformation circuit 15. At Stage 3, a lock fuse 16 may be disabled following coding of the programmable transformation block 15, protecting the configuration key 14 from discovery. A lock fuse 16 may be disposed on the programming circuitry through which the programming transformation block 15 is programmed by the user. By disabling the lock fuse 16, the cryptographic processing core including the programming transformation block 15 returns to having a single input point and single output point, thereby providing the type of protection discussed in detail above with respect to FIG. 2.

The present inventors have realized, among other things, that a merger of the separate transformation block and hashing block described above into a combined transformation/hashing block may provide several advantages. The integrated circuitry for such an implementation may require less power consumption than is required by separate transformation blocks and hashing blocks. It may also be possible to increase the efficiency and speed of a given hashing algorithm implementation through the preferential use of configuration keys 314 that exploit a particular combined transformation/hashing block implementation.

Broadly speaking, a one-way function compresses an input message of arbitrary length to a result (often termed a "hash" or "message digest") with a fixed length. For a cryptographic hash function, it should be computationally easy to find the hash of a message, but computationally difficult to find a message given only the hash. Further, given one message, it should be difficult to find another message that generates the same or even a similar hash as the hash of the first message. That is, any change in message content should produce drastic changes in the hash. Finally, the hash length should be large enough to prevent an attack from finding two different messages that each generate the same hash, so possible malicious capitalization upon collisions is avoided.

There are many ways to implement a hashing function, with most typically involving a preprocessing stage, a compression stage, and an output transformation stage. Most hashing functions are designed as iterative processes that hash an arbitrary-length input by processing fixed-sized blocks of that input. Each block may then serve as an input to an internal fixed-size compression function F, that computes a new intermediate result as a function of the previous intermediate results and the next input block. In some cases the same compression function is used so either hardware or software implementations can take advantage of its commonality. In other cases, different compression functions may be used in different processing iterations or rounds.

Figure 7:
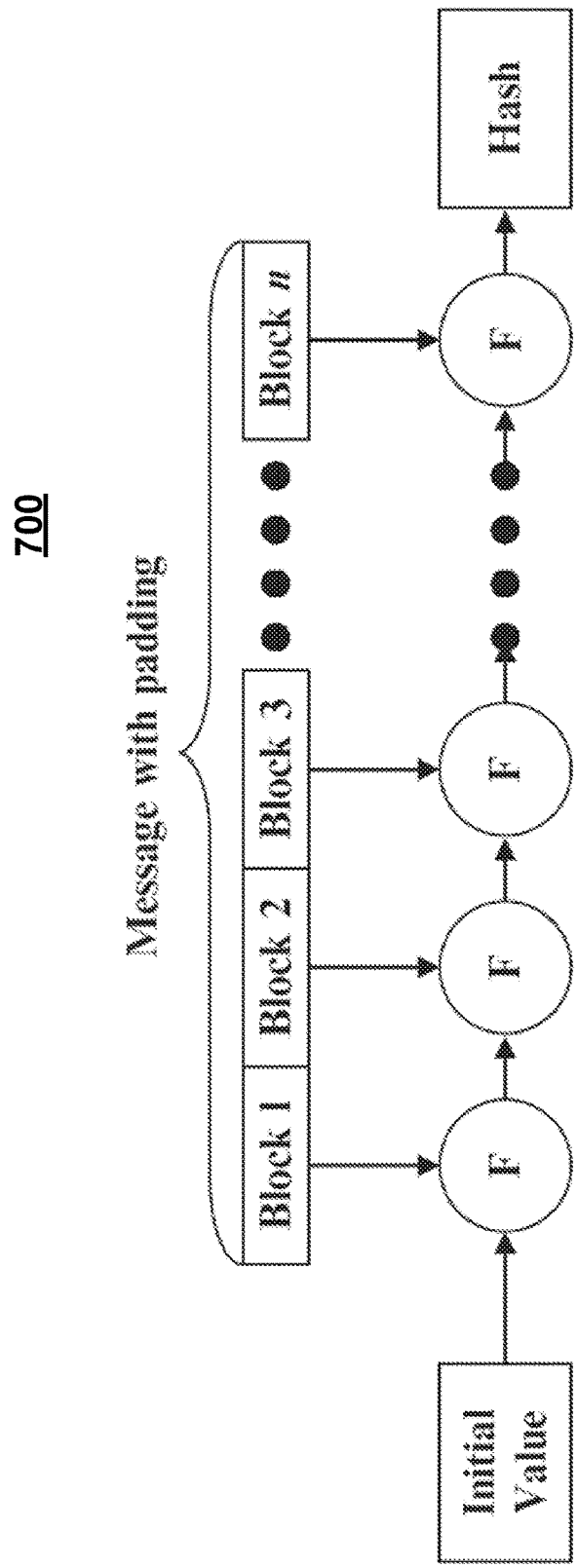
FIG. 7 is a block diagram of a Merkle-Damgård model hashing function in accordance with embodiments of the technology disclosed herein.

FIG. 7 shows an example of the Merkle-Damgård hashing function model 700, followed by the most popular hashing functions and contemplated as part of the technology disclosed herein. In this model, the input message is preprocessed by padding to a certain size by appending extra bits as necessary, and is then divided into an integer number of blocks or portions of uniform length. The portions are then each processed sequentially with the compression function F in this example.

Thus, starting with an initial hash, F repeatedly generates a new intermediate hash value from the previous intermediate hash value and a new message portion. The output of the final compression function is the hash of the input message. The security of this scheme relies on the security of the compression function F. The compression function is generally implemented with logic operations such as AND, OR, and XOR (exclusive-OR). Within a given round of processing, bits may also be rotated or shifted a number of times, such as in a register, to help further jumble the results of intermediate computations.

Regardless of the particular hashing function used, the intermediate state variables in the hashing function may be modified according to the transformation function previously described. That is, rather than using a transformation function to produce a transform-modified version of input data to be passed into a hashing function, the transformation function may instead alter hashing function internal state variables directly. In that sense, in such embodiments there is no separate transformation block producing an output and a hashing block operating on that output, as their interaction is effectively merged.

Figure 8:
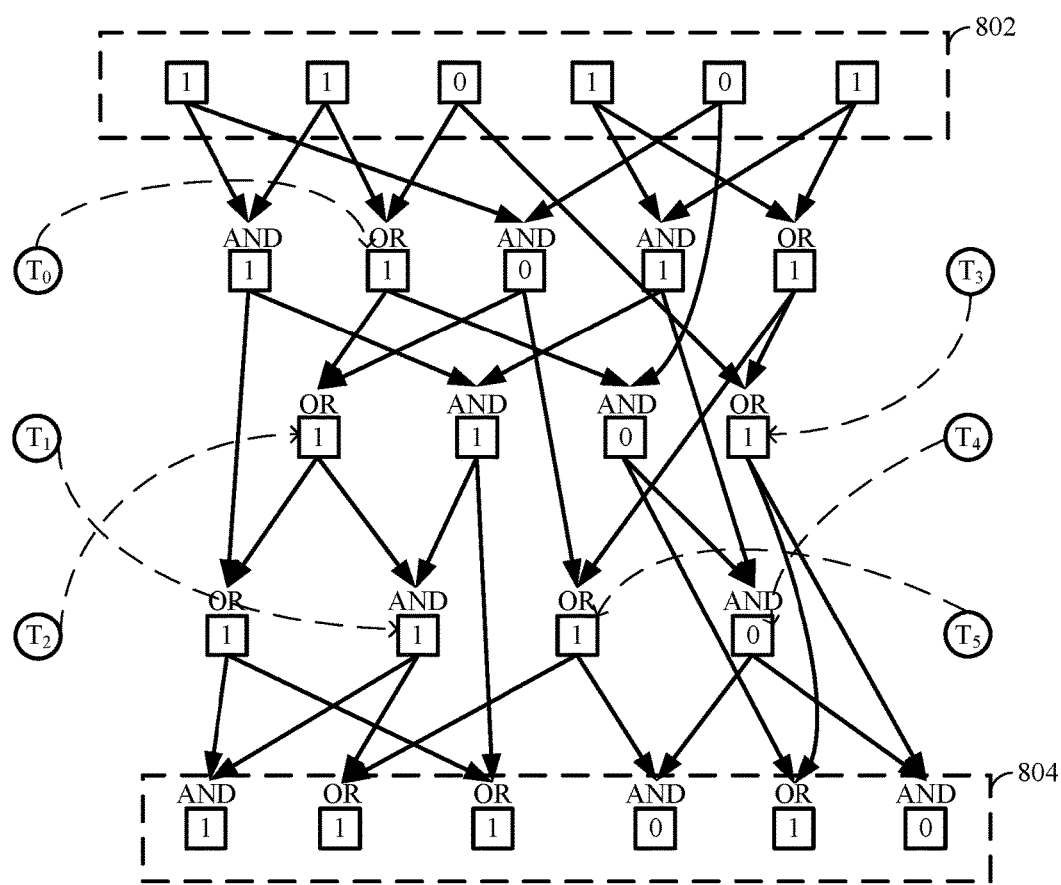
FIG. 8 illustrates an example combined transformation/hashing block in accordance with embodiments of the technology disclosed herein.

FIG. 8 shows an example of a combined transformation/hashing block 800 in accordance with embodiments of the technology disclosed herein. For a given exemplary set of logic functions used by a conventional hashing block to process a portion of a message, bits of the transform function may alter the internal state variables of the hashing block. The configuration key previously described therefore defines a transformation function that customizes the operations of the hashing function itself, rather than the input that is fed into the hashing function.

In this example, logic gates that comprise part of a hashing block process at least an incoming portion 802 of a message (six bits wide, and equal to "110101" here) to produce a hash 804 (also six bits wide, and equal to "111010" here). The example shown does not represent circuitry for any particular known hashing function, and is much simpler than a typical hashing function for clarity. Although not shown here, many hashing functions also perform bit shifts and utilize exclusive-OR operations as well.

Each bit of the incoming portion 802 of a message may be processed through a variety of logic gates, so that each bit of the hash 804 is a thoroughly mixed, jumbled, and recombined function of all of the bits of the incoming portion 802. Any change to any bit of the incoming portion 802 may cause a major change to the hash 804. The hash 804 may be computed very easily, but computation of the incoming portion 802 may be difficult if given only the hash 804.

Further, intermediate state variables in the combined transformation/hashing block 800 may be modified according to individual bits of a transformation function that has been programmed based on a configuration key. In this example, six bits from the transformation function, $T_0$ through $T_5$, are each applied to various intermediate states. The particular intermediate state variables that are modified may be chosen by a circuit designer for maximum efficiency and security. For simplicity, the transformation function used here may cause a bit inversion of the particular intermediate state variables, although in other embodiments a transformation function may instead cause a bit transposition or swap between two particular intermediate state variables. The use of both types of transformation function in a given implementation may prove advantageous.

The thirteen exemplary intermediate state variable values shown in FIG. 8 are those that occur without the application of a transformation function, or those that occur when the particular bit operations of a transformation function happen to have no net impact. One of ordinary skill will recognize that when a transformation function bit causes a given intermediate state variable to change, that change will propagate through the combined transformation/hashing block 802 to alter the resulting hash 804. Also, although the influence of particular bits of a transformation function is shown as being separately and externally applied, in actuality the transformation function operation (e.g., bit inversion or bit transposition) may be implemented directly in the datapath circuitry, as previously described.

Figure 9:
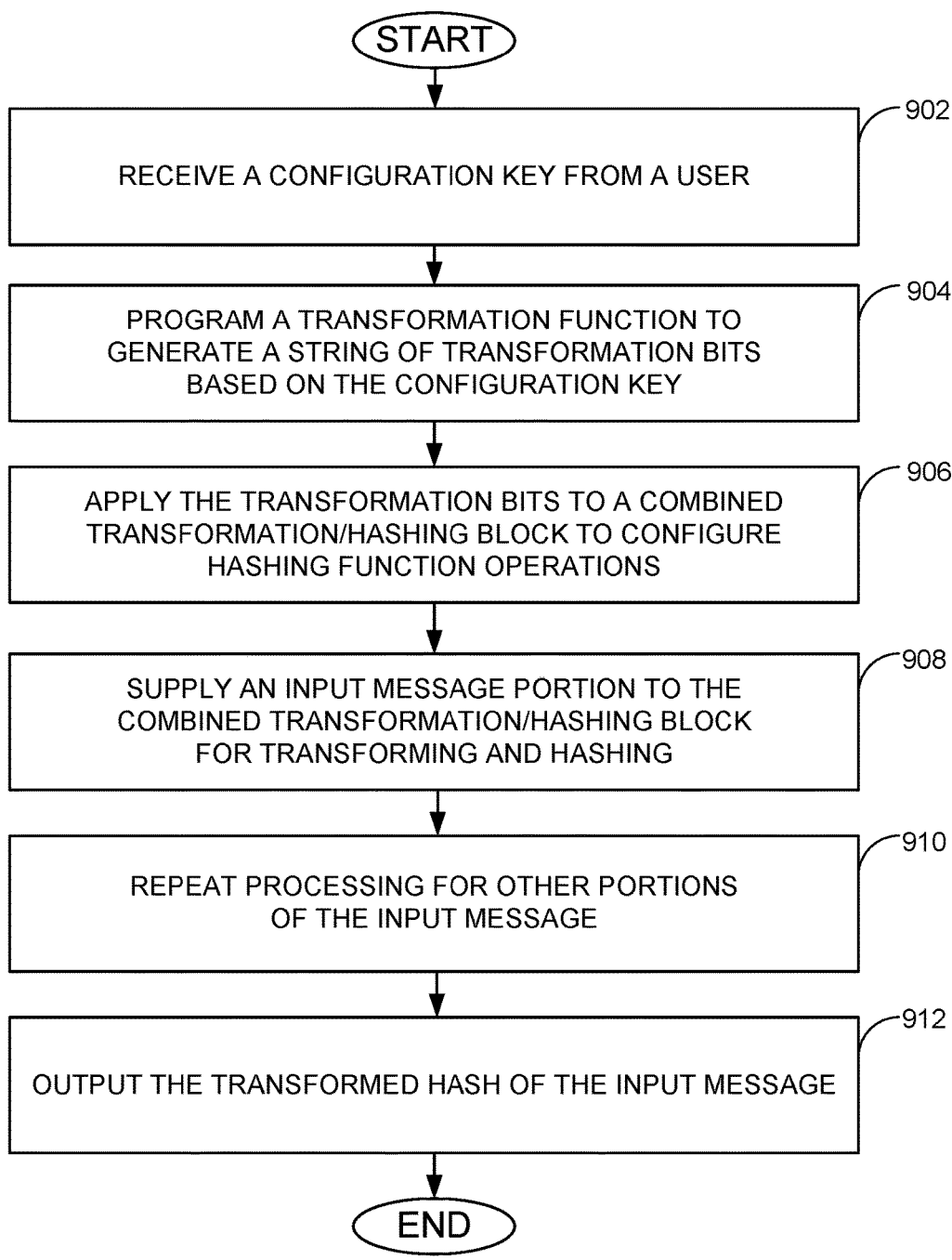
FIG. 9 illustrates an example transform-enabled integrated circuit methodology having a combined transformation/hashing block in accordance with embodiments of the technology disclosed herein.

FIG. 9 illustrates an example transform-enabled integrated circuit methodology 900 having a combined transformation/hashing block in accordance with embodiments of the technology disclosed herein. This method may be implemented in software, for example as program instructions stored in a computer-readable medium, and may operate substantially as the previously described cryptographic circuit operates. At 902 the method may receive a configuration key from a user through a configuration interface. At 904 the method may program a transformation function to generate a string of transformation bits based on the configuration key. At 906 the method may apply at least a subset of the string of transformation bits to a combined transformation/hashing block to configure the operations of a hashing function. That is, the configuration key indirectly controls the hashing function itself, rather than just the input data received by the hashing function. At 908 the method may supply at least a portion of an input message to the combined transformation/hashing block to be transformed and hashed. At 910 the method may repeat the processing described for one portion of an input message for the other portions of an input message. At 912 the method may output and store the transformed hash of the input message.

The method (as well as the circuit) may be implemented in parallel, so that a number of messages may be processed substantially simultaneously. Multiple combined transform/hashing blocks may be used in series, so that the transformed hash of a transformed hash of a message may be generated. Different transformation functions may be used in such embodiments, and each may be determined by a different configuration key. Different hashing functions may be used in such embodiments as well.

In this document explicit reference has only been made of certain cryptographic hashing algorithms, specifically the second iteration of the Secure Hashing Algorithm family (SHA-2), and within that particularly the 256-bit version. However, the technology described herein is fully applicable to other cryptographic hashing algorithms, including without limitation: SHA-2 in its various implementations; Keccak/SHA-3 in its various implementations; Skein in its various implementations; Grøstl in its various implementations; JH in its various implementations; and others.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more components and can also be comprised of hardware, software or a combination thereof. Thus, for example, a tool can be a collection of one or more software components, hardware components, software/hardware components or any combination or permutation thereof. As another example, a tool can be a computing device or other appliance on which software runs or in which hardware is implemented.

Figure 10:
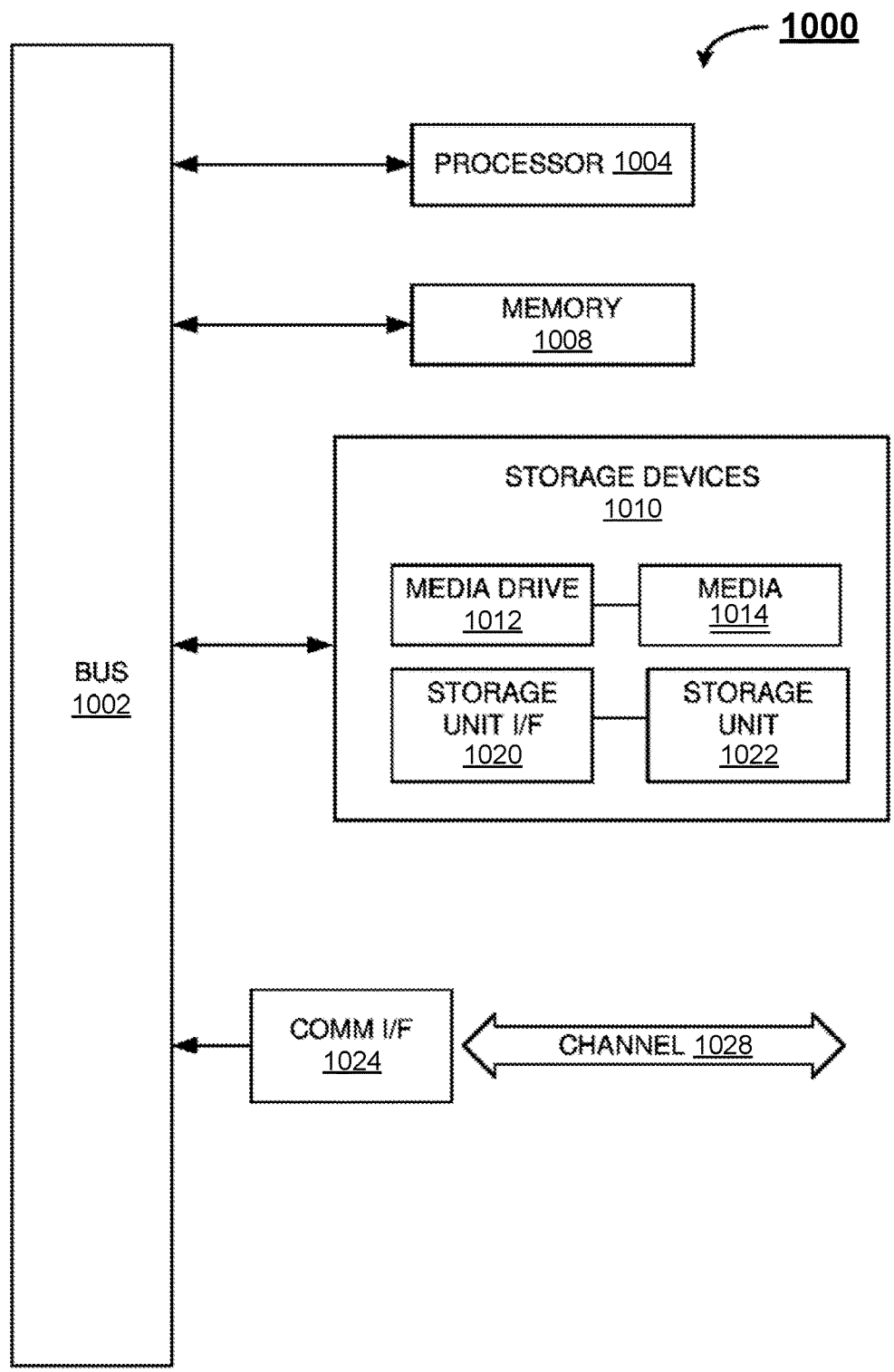
FIG. 10 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the technology are implemented in whole or in part using software, in one embodiment, these software elements can be implemented to operate with a computing or processing component capable of carrying out the functionality described with respect thereto. One such example computing component is shown in FIG. 10. Various embodiments are described in terms of this example-computing component 1000. After reading this description, it will become apparent to a person skilled in the relevant art how to implement the technology using other computing components or architectures.

Referring now to FIG. 10, computing component 1000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 1000 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 1000 might include, for example, one or more processors, controllers, control components, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing component 1000 or to communicate externally.

Computing component 1000 might also include one or more memory components, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

The computing component 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing component 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory component) and memory slot, a PCMCIA slot and card, and other fixed or removable storage units 1022 and interfaces 1020 that allow software and data to be transferred from the storage unit 1022 to computing component 1000.

Computing component 1000 might also include a communications interface 1024. Communications interface 1024 might be used to allow software and data to be transferred between computing component 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A cryptographic integrated circuit, comprising:
 a combined transformation/hashing block comprising a set of electronic circuitry that is programmable after the manufacture of the integrated circuit to perform a transformation operation and a hashing operation on input data to produce and store output data; and
 a programming circuit communicatively coupling the combined transformation/hashing block and a configuration interface; wherein the combined transformation/hashing block is configured to be programmed through the configuration interface based on a configuration key received from a user, and wherein the combined transformation/hashing block alters internal state variable values of the hashing operation according to the transformation operation.

2. The cryptographic integrated circuit of claim 1, wherein the transformation operation comprises at least one of a bit inversion and a bit transposition.

3. The cryptographic integrated circuit of claim 1, wherein the hashing operation comprises one of SHA-2, Keccak/SHA-3, Skein, Grøstl, and JH.

4. The cryptographic integrated circuit of claim 1, wherein the combined transformation/hashing block is configured as datapath circuitry capable of operating at the same speed as other datapath circuitry.

5. The cryptographic integrated circuit of claim 1, wherein the cryptographic integrated circuit is implemented in a cryptographic proof-of-work system comprising a blockchain system.

6. The cryptographic integrated circuit of claim 1, further comprising a plurality of combined transformation/hashing blocks connected in series.

7. The cryptographic integrated circuit of claim 1, wherein the configuration key is embodied as circuitry into at least one independent cryptographic circuit of the cryptographic integrated circuit.

8. A cryptographic method, comprising:
receiving a configuration key from a user;
programming a transformation function, based on the configuration key;
performing a hashing operation on input data including altering internal state variable values of the hashing operation based on the programmed transformation function; and
outputting the result of the transform-enabled hashing operation.

9. The cryptographic method of claim 8, wherein the altering comprises at least one of a bit inversion and a bit transposition.

10. The cryptographic method of claim 8, wherein the hashing operation comprises one of SHA-2, Keccak/SHA-3, Skein, Grøstl, and JH.

11. The cryptographic method of claim 8, wherein the method is a cryptographic proof-of-work method comprising a blockchain method.

12. The cryptographic method of claim 8, further comprising executing the method a plurality of times in a sequence.

13. The cryptographic method of claim 8, further comprising executing the method in parallel for a number of input data sets.

14. The cryptographic method of claim 8, further comprising using a separate configuration key for each execution of the method.

15. A non-transitory computer-readable storage medium having embedded therein a set of instructions which, when executed by one or more processors of a computer, causes the computer to execute cryptographic operations comprising:
receiving a configuration key from a user;
programming a transformation function, based on the configuration key;
performing a hashing operation on input data including altering internal state variable values of the hashing operation based on the programmed transformation function; and
outputting the result of the transform-enabled hashing operation.

16. The medium of claim 15, wherein the altering comprises at least one of a bit inversion and a bit transposition.

17. The medium of claim 15, wherein the cryptographic operations implement a cryptographic proof-of-work method comprising a blockchain method.

18. The medium of claim 15, further comprising instructions for executing the cryptographic operations a plurality of times in a sequence.

19. The medium of claim 15, further comprising instructions for executing the cryptographic operations in parallel for a number of input data sets.

20. The medium of claim 15, further comprising instructions for using a separate configuration key for each execution of the cryptographic operations.

* * * * *